US012491905B2

(12) United States Patent
 Monaco

(10) Patent No.: US 12,491,905 B2
(45) Date of Patent: Dec. 9, 2025

(54) EVALUATING INTEGRITY OF VEHICLE POSE ESTIMATES VIA SEMANTIC LABELS

(71) Applicant: Mercedes-Benz Group AG, Stuttgart (DE)

(72) Inventor: Christopher Monaco, Sunnyvale, CA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 345 days.

(21) Appl. No.: 18/069,658

(22) Filed: Dec. 21, 2022

(65) Prior Publication Data

US 2024/0208530 A1    Jun. 27, 2024

(51) Int. Cl.
 *B60W 60/00* (2020.01)
 *B60W 40/10* (2012.01)

(52) U.S. Cl.
 CPC .......... *B60W 60/001* (2020.02); *B60W 40/10* (2013.01); *B60W 2554/4041* (2020.02); *B60W 2554/4049* (2020.02)

(58) Field of Classification Search
 None
 See application file for complete search history.

(56) References Cited

U.S. PATENT DOCUMENTS

| 11,030,525 | B2 | 6/2021 | Wang et al. |
| 11,430,182 | B1 * | 8/2022 | Yang ........................ G06T 19/20 |

| 2017/0316333 | A1 | 11/2017 | Levinson et al. |
| 2018/0336421 | A1 | 11/2018 | Huang et al. |
| 2021/0182596 | A1 | 6/2021 | Adams et al. |

(Continued)

FOREIGN PATENT DOCUMENTS

| CN | 110146096 A * | 8/2019 | ............. G01C 11/04 |
| CN | 113256711 A   | 8/2021 | |

(Continued)

OTHER PUBLICATIONS

Roh et al "Accurate Mobile Urban Mapping via Digital Map-Based SLAM." https://doi.org/10.3390/s16081315, Sensors, Jun. 7, 2016, 24 pages.

(Continued)

*Primary Examiner* — Justin S Lee
(74) *Attorney, Agent, or Firm* — ANOVA LAW GROUP, PLLC

(57) ABSTRACT

Subject matter disclosed herein may relate to systems, devices and/or processes for monitoring and/or evaluating vehicle pose integrity for use with an autonomous driving controller. A system may include memory, the memory comprising one or more memory devices and a processor coupled to the one or more memory devices, the processor configured to access, from the one or more memory devices, sensor measurements generated by one or more sensors mounted in a vehicle. The system may additionally observe one or more semantic classes to one or more physical entities based on the generated sensor measurements and extract one or more semantically-labeled map parameters from an electronic map the system may additionally determine a correlation between the one or more observed semantic classes and one or more expected classes extracted from the semantically-labeled map parameters.

20 Claims, 5 Drawing Sheets

(56) References Cited

U.S. PATENT DOCUMENTS

| | | |
|---|---|---|
| 2022/0024485 A1 | 1/2022 | Theverapperuma et al. |
| 2022/0234621 A1* | 7/2022 | Fasola ............... B60W 60/0015 |

FOREIGN PATENT DOCUMENTS

| | | | |
|---|---|---|---|
| DE | 102019216722 A1 * | 5/2021 | |
| DE | 102022000563 A1 * | 4/2022 | |
| DE | 102021111325 A1 * | 11/2022 | ............ B60W 30/08 |

OTHER PUBLICATIONS

Balakrishnan et al "An Integrity Assessment Framework for Multi-modal Vehicle Localization," https://hal.archives- ouvertes.fr/hal-02393213, 2019 IEEE Intelligent Transportation Systems Conference- ITSC, Oct. 2019, Auckland, New Zealand, 9 pages.

Taira et al "InLoc: Indoor Visual Localization with Dense Matching and View Synthesis," 2018 IEEE/CVF Conference on Computer Vision and Pattern Recognition, Mar. 28, 2018, 11 pages.

Balakrishnan et al "Integrity Monitoring of Multimodal Perception System for Vehicle Localization," https://doi.org/10.3390/s20164654, Sensors, Jul. 22, 2020, 16 pages.

Taira et al"Is This the Right Place? Geometric-Semantic Pose Verification for Indoor Visual Localization," 2019 IEEE/CVF International Conference on Computer Vision, Aug. 13, 2019, 11 pages.

Toft et al "Semantic Match Consistency for Long-Term Visual Localization," European Conference on Computer Vision (ECCV 2018), Munich, Germany, Sep. 8-14, 2018, 17 pages.

\* cited by examiner

EVALUATING INTEGRITY OF VEHICLE POSE ESTIMATES VIA SEMANTIC LABELS

BACKGROUND

Field

Subject matter disclosed herein may relate to systems, devices and/or processes for determination of the integrity of sensor signals and/or measurements for use with, for example, autonomously operatable vehicles.

Information

In an autonomous vehicle driving application, for example, measurements of various sensors and/or measurement devices may be utilized in a process of estimating the location of the vehicle. Based on estimates of a vehicle location, an autonomous vehicle driving application may operate to reposition the vehicle or to modify, for example, orientation of the vehicle, a velocity vector of the vehicle, or to perform some other control function or operation. By way of exercising such control over a vehicle's movement, an autonomously operatable vehicle may avoid contact with obstacles, such as other vehicles, stationary or moving animals or pedestrians, road features, buildings, and so forth. Failure to accurately estimate a current location of an autonomously operatable vehicle may lead to potentially hazardous events such as, for example, for example, wrong turns, unsafe lane changes, excessive speed, collisions, and so forth.

However, present-day autonomous vehicle driving applications may include one or more flaws which, at least under certain circumstances, can contribute to such potentially hazardous events. Thus, improvements in processes to localize an autonomously operatable vehicle, and to perform autonomous driving functions appropriate for the vehicle's current location, continues to be an active area of investigation.

SUMMARY

One general aspect includes a vehicle pose integrity monitor for use with an autonomous driving controller, which includes a memory, the memory including one or more memory devices. The vehicle pose integrity monitor also includes a processor coupled to the one or more memory devices, the processor configured to access, from the one or more memory devices, sensor measurements generated by one or more sensors mounted in a vehicle. The processor is additionally configured to assign one or more semantic classes to one or more physical entities observed in the sensor measurements. The processor is additionally configured to generate expected semantic classes based on a vehicle pose estimate and one or more semantically-labeled parameters from an electronic map. The processor is additionally configured to determine a correlation between one or more of the observed semantic classes and one or more of the expected semantic classes. Other embodiments of this aspect include corresponding computer processors, non-transitory computer-readable media having instructions encoded thereon, and methods that perform the above-identified operations.

In particular embodiments, the one or more physical entities includes a non-drivable region, a drivable region, a structure, a lane marking, a natural object or a traffic sign, a dynamic object(s), or a combination thereof. In particular embodiments, the processor is further configured to compute localization integrity based on the correlation between the one or more observed semantic classes and the one or more expected classes generated from a vehicle pose estimate and the semantically-labeled map parameters. In particular embodiments, the processor is further configured to execute one or more operations to plan motion of the vehicle based on the computed localization integrity. In particular embodiments, the one or more operations to plan motion of the vehicle based on the computed localization integrity further include one or more operations to direct at least one autonomous driving application to perform one or more functions to influence a motion vector of the vehicle. In particular embodiments, computation of the correlation is to be based on computation of number of semantic class true positives, false positives, true negatives, and false negatives. In particular embodiments, the processor is further configured to compute one or more vehicle pose hypotheses based on the probability distribution of the vehicle pose estimate. In particular embodiments, the processor is further configured to select one or more vehicle pose hypotheses that represent deviations from the vehicle pose estimate or from the mean of the vehicle pose estimate's probability distribution. In particular embodiments, the processor transforms each pose hypothesis into its corresponding integrity metric based on the above-mentioned correlation between the observed semantic classes and the expected semantic classes generated from a pose hypothesis and the semantically-labeled map parameters. In particular embodiments, the processor computes the localization integrity based on the weighted average of the vehicle pose hypotheses' integrity metrics.

Other embodiments of such aspects include corresponding computer processors, non-transitory computer-readable media having instructions encoded thereon, and methods that perform the above-identified operations.

BRIEF DESCRIPTION OF THE DRAWINGS

Claimed subject matter is particularly pointed out and distinctly claimed in the concluding portion of the specification. However, both as to organization and/or method of operation, together with objects, aspects, and/or advantages thereof, claimed subject matter may be best understood by reference to the following detailed description if read with the accompanying drawings in which:

Figure 1:
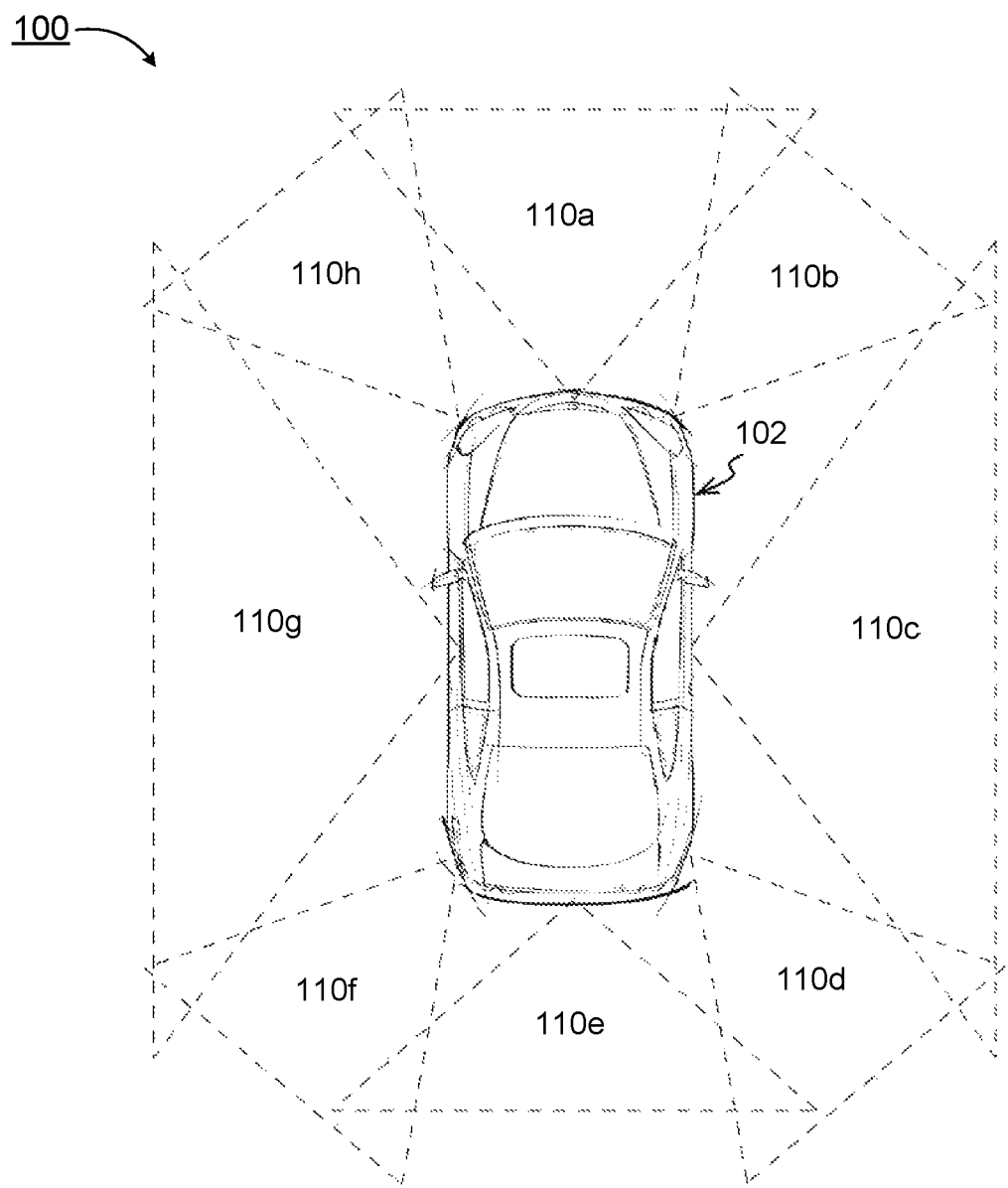
FIG. 1 is an illustration depicting example sensor signal gathering for evaluating integrity of vehicle pose via semantic labels, according to an embodiment.

Reference is made in the following detailed description to the accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. In addition, it is to be understood that other embodiments may be utilized. Moreover, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular aspects, structures, and/or characteristics described are capable of being combined in various ways in one or more implementations and, therefore, are within intended claim scope, for example. In general, of course, these and other issues vary with context. Therefore, particular context of description and/or usage provides guidance regarding inferences to be drawn.

As previously alluded to, in an autonomous vehicle driving application, for example, measurements of various sensors and/or measurement devices may be utilized in a process of estimating the current position and orientation or "pose" of an autonomously operatable vehicle. In this context, the term "pose" refers to a current position and orientation of a vehicle. Thus, in one simple example, at a given instant, and within predetermined error thresholds, a vehicle may be oriented at a heading of 000 degrees and be located at a particular set of location coordinates (e.g., GPS coordinates). It should be noted, however, that claimed subject matter is intended to embrace any approach toward describing a current location of a vehicle as well as an orientation of the vehicle, such as via other coordinate systems, virtually without limitation.

An estimate of localized vehicle pose may be utilized by an autonomous vehicle driving application via assigning appropriate weights to output signals from a vehicle-mounted lidar sensor, an imaging sensor (e.g., a camera), an infrared sensor, a radar signal sensor, an ultrasonic sensor, or any other type of sensor or measurement device. Based on an estimation of vehicle pose, an autonomous vehicle driving application may control or influence a vehicle's motion vector, so as to avoid encountering a fixed or moving obstacle currently in the path, or estimated to be approaching the path, of an autonomously operated vehicle. Weighted observations and/or measurements from the various sensors may be combined utilizing an optimization filter of a measurement model, which operates to cross correlate among sensor observations and/or measurement input signals, account for sensor latencies, retrodict and/or predict an estimated position of stationary obstacles and dynamic obstacles, and eliminate or at least discount spurious sensor output signals.

Accordingly, based on a determination of the presence of stationary and moving obstacles in an expected path of travel of a vehicle, an autonomous vehicle driving application may exert one or more functions to control or at least influence the vehicle speed and direction, such as applying braking, reducing the speed of the vehicle, increasing the speed of the vehicle, and/or steering the vehicle to the left or to the right so as to avoid encountering the obstacle. In some instances, an autonomous vehicle driving application may alert the driver that autonomous operation of the vehicle should not or cannot be performed at the present time. By way of exercising such control or influence over a vehicle's movement, an autonomously operable vehicle may safely travel through congested city streets, freeways, and rural roads while avoiding contact with numerous types of obstacles, such as other vehicles, stationary or moving animals, natural objects, and so forth. Failure to accurately estimate a current position and orientation of an autonomously operable vehicle may lead to, for example, wrong turns, unsafe lane changes, excessive speed, collisions, or may lead to numerous other hazardous or potentially hazardous events.

However, present day autonomous vehicle driving applications may include one or more flaws which, at least under certain circumstances, can contribute to such hazardous or potentially hazardous events. Such flaws may give rise to unacceptably high errors in estimates of vehicle pose, which may be brought about in response to obtaining and/or processing conflicting output signals of vehicle sensors and/or measurement devices mounted on the autonomously operated vehicle. For example, if an onboard radar signal receiver detects presence of an obstacle, while an obstacle has not been detected by other onboard sensors (e.g., one or more of an onboard lidar, image capture device, ultrasonic sensor, etc.), an autonomous vehicle driving application may erroneously estimate that an obstacle is not present in the vehicle's path of travel. In another example, an autonomous vehicle driving application may erroneously determine that an obstacle is present, when, in fact, no obstacle is present in the driving path of the vehicle. Under such circumstances, an autonomous vehicle driving application may unnecessarily reduce the vehicle's speed and/or adjust the vehicle's direction of travel so as to avoid a phantom obstacle.

In an attempt to remedy the above-described shortcomings, an autonomous vehicle driving application may utilize one or more approaches to determine whether a particular sensor, for example, is degraded or entirely inoperative. Based, at least in part, on detection that a sensor, a measurement device, or other source of observations and/or measurements is functioning abnormally, an autonomous vehicle driving application may ignore (or at least discount) output signals from the suspected sensor or measurement device. Under such circumstances, an autonomous vehicle driving application may invoke a fallback or degraded operational mode, which may permit a reduced set of autonomous vehicle driving functions to be performed. However, it may be appreciated that, at least under some circumstances, an abnormally functioning sensor, measurement device, or other source of observations and/or measurements may go undetected by an autonomous vehicle driving application. In such instances, the driving application may continue to access output signals (or memory states representing such output signals) conveyed by the abnormally functioning signal source, even though such signals may not accurately indicate an aspect of the localized environment of the vehicle.

In particular instances, an inability to accurately detect an abnormally functioning sensor, measurement device, or other signal source may present a particularly problematic and/or hazardous situation. For example, responsive to an onboard radar receiver correctly detecting a presence of an obstacle in a vehicle's path of travel, while an abnormally functioning lidar system inaccurately estimates the obstacle's location, an autonomous vehicle driving application may, for example, adjust the steering of the vehicle. However, under such circumstances, an autonomous vehicle driving application may function to steer the vehicle into the actual direction of the reported obstacle, thereby bringing about a collision with the obstacle. Further, in such an instance, based on a failure to detect abnormal functioning of the lidar system, such collision could potentially occur at an unsafe rate of speed and without any type of warning to a driver of the autonomously operated vehicle.

Accordingly, improvements in autonomous vehicle driving applications may avoid the above-described scenario, in which the driving application may exclusively attempt to maintain integrity of the vehicle driving application via discounting, or ignoring entirely, output signals from particular signal sources. Thus, in particular embodiments, such as those described herein, integrity of an autonomous vehicle driving application may be enhanced utilizing a system-level approach, rather than merely focusing on output signals from individual abnormally-functioning signal sources. For example, in particular embodiments, an autonomous vehicle driving application may utilize a semantically-labeled digital map, and/or parameters derived from a semantically-labeled digital map, to facilitate a system-level integrity check rather than attempting to authenticate or validate individual signal sources. As the term is used herein, a "semantically-labeled digital map" refers to an electronic digital map, an electronic representation of at least certain parameters of a digital map, or other type of digitized diagram showing, in two or more dimensions, an area of land depicting physical features. Such physical features may include drivable or non-drivable regions having labeled features disposed thereon. For example, a semantically-labeled map may correspond to an electronic digital map indicating paths of travel, such as roads (e.g., expressways, freeways, turnpikes, etc.), signposts (e.g., stop signs, yield signs, speed limit signs, informational signs, mile markers, billboards, etc.), natural obstacles and features (e.g., trees, bodies of water, etc.), freeway interchanges, off-ramps, on-ramps, bridges, and numerous other features.

Hence, in particular embodiments, pose of an autonomously operated vehicle may be correlated with one or more expected obstacles and/or features from a semantically-labeled digital map or expected obstacles and/or features derived from parameters of a semantically-labeled digital map. Based on a relatively high correlation, or a correlation greater than a predetermined threshold, between the expected semantic classes and observed semantic classes, integrity of the localized vehicle pose may be considered to be relatively high. In particular embodiments, expected semantic classes are based on (or even highly dependent upon) the vehicle pose estimate. Consequently, it may be appreciated that such correlation between observed and semantic classes may serve as an integrity metric of a vehicle pose estimate. Conversely, based, at least in part, on a relatively low correlation between a vehicle's estimated pose, or a correlation below a predetermined threshold, and the vehicle's expected location on a semantically-labeled map, for example, integrity of the localized vehicle pose may be considered to be relatively low. Thus, in various embodiments, based, at least in part, on a vehicle's computed localization integrity, an autonomous vehicle driving application may perform, for example, one or more functions to control or influence the velocity vector of the vehicle. In a simple example, one or more sensors and/or measurement devices of an autonomously operated vehicle may bring about estimation, for example, of the presence of a "Stop" sign (or other semantically-labeled traffic marker) at a particular traffic intersection. Responsive to estimating that the present location of the vehicle is strongly correlated with a particular location that is proximate to a "Stop" sign depicted on a semantically-labeled map, it may be highly likely that the pose of the vehicle has been estimated with a relatively high degree of integrity. Thus, in brief, comparison of a sensor-derived estimate of vehicle pose with features expected to be present on a semantically-labeled map may, at least in some embodiments, facilitate corroboration of vehicle localized pose with the semantically-labeled image.

In this context, the term "localization," or forms thereof, refers to a process of estimating the present location of an autonomously operable vehicle so that motion control functions of the vehicle can be planned and/or performed. Also in this context, the term "localization integrity" refers to a measure of confidence in an estimate of vehicle pose with respect to the vehicle's surrounding environment. For example, based, at least in part, on a localization operation that estimates an autonomously operable vehicle to be at a particular position on a freeway with relatively high localization integrity, vehicle control functions may be performed (or at least planned to be performed) that are appropriate for freeway driving. Such control functions may include attaining a speed comparable to the flow of other vehicles in traffic, maintaining a safe distance between the vehicle and vehicles positioned in front of or behind the vehicle, and so forth. In another example, based, at least in part, on a localization operation that estimates a position of an autonomously operated vehicle on a road approaching a "Stop" sign, with relatively high localization integrity, an autonomous vehicle driving application may apply braking to the vehicle so as to bring the vehicle to a complete stop before reaching the "Stop" sign. Conversely, based, at least in part, on a localization operation that estimates an autonomously operated vehicle as being at a particular location, with relatively low localization integrity, an autonomous vehicle driving application may display an advisory message to a driver to indicate that autonomous vehicle driving is not advised. Alternatively, or in addition to, an indication of relatively low localization integrity may give rise to an autonomous vehicle driving application entering a fallback or degraded mode of operation.

In particular embodiments, an integrity check may be capable of utilizing additional semantic classes than a localization pose estimation process. In some instances, a pose estimation process may be limited to semantic classes with a simple geometrical parameterization, such as lane markings, poles, traffic signs, etc. Conversely, an integrity check capable of utilizing a more generalized set of semantic classes, including dynamic objects and physical entities with more arbitrary shapes. Use of such additional information and/or parameters may be, at least in particular embodiments, critical for ensuring that the integrity check is not susceptible to same shortcomings as the pose estimate evaluated by the integrity check.

In particular embodiments, localization integrity determination via comparison of vehicle pose with semantic labels from, for example, a digital map, may involve computation of a correlation coefficient that considers true positive rate counts, false positive rate counts, true negative rate counts, and false negative rate counts. However, as may be the case in typical, present-day approaches toward semantic labeling corresponding to a class, imbalances in dominant semantic classes (e.g., "drivable road," "lane marking," "traffic sign," etc.) may introduce inaccuracies in computation of a correlation coefficient. Accordingly, particular embodiments may utilize the Matthews correlation coefficient, which, advantageously, accounts for both positive and negative evidence (e.g., false positive counts, true positive counts, true negative counts, and false negative counts) as well as avoiding inaccuracies introduced by dominant semantic classes. Particular embodiments may implement a computer-implemented transform that operates to estimate a result of applying a nonlinear transformation to a probability distribution characterized in terms of a finite set of statistics. In one or more of such embodiments, the Unscented transform, which may represent a more computationally efficient approach than alternative sample-based approaches (e.g., Monte Carlo methods, particle filters, histogram filters, etc.), may be utilized to account for uncertainties in estimates of vehicle pose.

Certain embodiments may account for uncertainty or a probability distribution of the pose estimate. In one or more of such embodiments, pose hypotheses may be formed, in which each pose hypotheses corresponds to its own correlation coefficient. A non-linear transform, such as the Unscented transform, Monte Carlo methods, particle filters, and so forth may be utilized to compute a weighted average of the correlation coefficients. Fused correlation coefficients may then be published as an integrity metric of a vehicle pose estimate.

Thus, in particular embodiments, implementing one or more of the above-described approaches may bring about relatively high integrity localization of pose estimates of autonomously operatable vehicles. Based on a determination that a vehicle pose estimate is of relatively high integrity, an autonomous vehicle driving application may determine that observation and/or measurement devices are performing with relatively high integrity. An autonomous vehicle driver may therefore be assured that an autonomous driving application is operating within appropriate and/or predetermined safety margins. Conversely, based on a lower correlation between an obstacle observed and/or measured via sensors mounted on the vehicle and parameters extracted from a semantically-labeled map, an autonomous vehicle driving application may determine that observation and measurement devices may be operating with somewhat lower integrity. Based on a determination of a somewhat lower integrity of sensor and/or measurement device operation, a driver of an autonomously operatable vehicle may be less assured that an autonomous driving application is operating within appropriate and/or predetermined safety margins.

Although particular embodiments described herein may refer to autonomously operatable vehicles, subject matter is not limited in scope in this respect. For example, output signals from sensors and/or measurement devices may be utilized in any of a wide range of possible applications and/or use cases. Further, as the term is used herein, "sensor," or the like, refers to a device and/or component that may respond to physical stimuli, such as, for example, heat, light, sound pressure, time-varying electromagnetic fields, particular motions, etc., and/or that may generate one or more signals and/or states in response to such physical stimulus. Example sensor types may include, but are not limited to, accelerometers, gyroscopes, thermometers, magnetometers, barometers, light sensors, lidar sensors, radar sensors, proximity sensors, microphones, cameras, etc., or any combination thereof.

FIG. 1 is an illustration depicting example sensor signal gathering for evaluating integrity of vehicle pose via semantic labels, according to an embodiment 100. As depicted in FIG. 1, an autonomously operatable vehicle, such as autonomously operatable vehicle 102, may include a number of onboard sensors. Although a particular pattern and/or a particular number of sensors is depicted and/or inferred in the embodiment of FIG. 1, subject matter is not limited in scope in this respect. For example, a system or device, such as utilized by autonomously operatable vehicle 102, may include any number of sensors in any of a wide range of arrangements and/or configurations. In addition, although FIG. 1 is depicted as a two-dimensional representation, sensors of an autonomously operatable vehicle, for example, may generate signals and/or signal packets representative of conditions surrounding vehicle 102 in a three-dimensional space. In particular embodiments, one and/or two-dimensional sensor measurements may be combined and/or otherwise processed to produce a three-dimensional representation of an environment that at least partially surrounds or envelops vehicle 102.

In particular embodiments, various sensors may be mounted on vehicle 102, for example, so as to facilitate sensing, imaging, and/or measuring of differing portions of an environment surrounding and/or adjacent to vehicle 102. Vehicle 102 may include multiple sensor functionalities, which provide a capability for detecting incoming signals, such as incoming signals corresponding to visible light, infrared energy, ultraviolet energy, RF energy, microwave and millimeter wave energy, coherent laser energy, etc. Sensors of vehicle 102 may additionally include acoustic sensors, which respond to variations in sound pressure, for example. Individual sensors may utilize differing fields of observation into an environment surrounding or enveloping vehicle 102. Example fields-of-view 110a, 110b, 110c, 110d, 110e, 110f, 110g, and 110h are depicted, although claimed subject matter is intended to embrace any configuration of sensor or measurement device fields-of-view of sensors of vehicle 102.

In particular embodiments, output signals and/or output signal packets transmitted from onboard sensors of vehicle 102 may be utilized by at least one processor of the vehicle to facilitate semantic classification of obstacles and/or other environmental features in the vicinity of the vehicle. Such output signals may be utilized by the one or more processors of vehicle 102 to autonomously guide the vehicle through the environment, for example. Example obstacles that may be estimated to be present in an environment surrounding vehicle 102 may include semantic classes such as other, similar vehicles, as well as trucks, cyclists, pedestrians, animals, rocks, trees, lampposts, signposts, lane markings, signal lights, buildings, road signs, etc. Some obstacles may be classified as "static," while other objects, such as moving vehicles, trucks, cyclists, pedestrians, and animals, may be classified as "dynamic," as such obstacles move or translate through the localized environment of vehicle 102. Further, certain features may be determined to be present in an environment surrounding vehicle 102, which may include lane markings, traffic lights, bridges, overhead signposts, railroad tracks, etc.

In an embodiment, one or more sensors or measurement devices of autonomously operatable vehicle 102 may generate signals and/or signal packets that may be representative of at least a portion of the environment surrounding and/or adjacent to vehicle 102. Additional sensors or measurement devices may generate signals and/or signal packets that represent a speed, acceleration, orientation, position (e.g., via signals from a satellite positioning system such as GPS), etc., of vehicle 102. As described in greater detail hereinbelow, sensor signals and/or signal packets may be processed so as to facilitate autonomous driving of vehicle 102, such as via an autonomous vehicle driving application. In implementations, as vehicle 102, for example, proceeds through an environment, sensor signals and/or signal states may be utilized to provide estimates of vehicle pose. Based, at least in part, on vehicle localization parameters being of relatively high integrity, an autonomous vehicle driving application may maintain control over the velocity vector of the vehicle, apply braking, or exercise other functionality with a high degree of confidence that such control functions are appropriate.

Figure 2A:
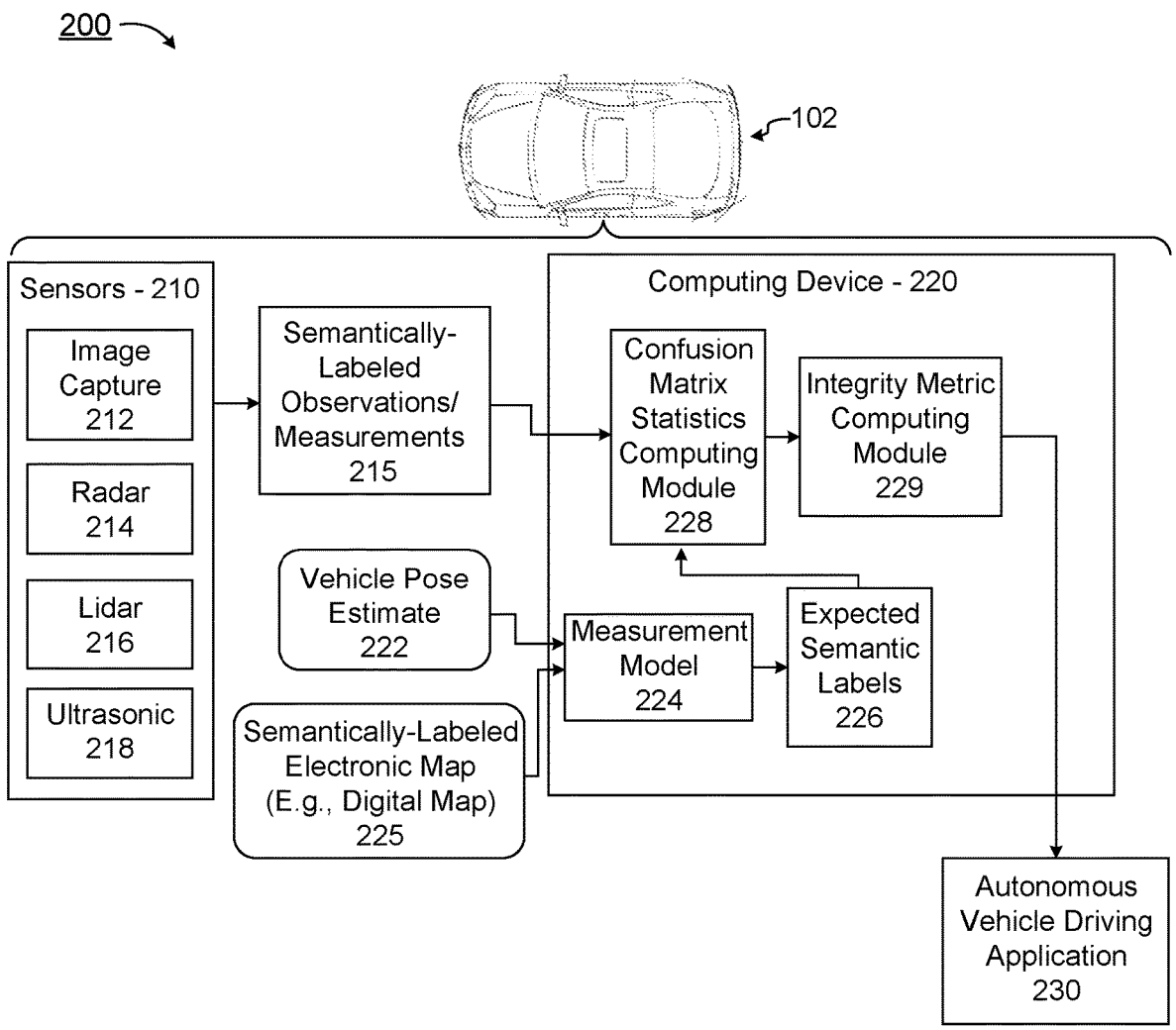
FIG. 2A depicts a schematic block diagram of an example system for evaluating integrity of vehicle pose estimates via comparison of sensor-estimated vehicle pose with semantic labels on or derived from a digital map, according to an embodiment.

FIG. 2A depicts a schematic block diagram of an example system for evaluating integrity of vehicle pose estimates via comparison of sensor-estimated vehicle pose with semantic labels on or derived from a digital map, according to an embodiment 200. The particular, nonlimiting, embodiment of FIG. 2A is focused on computing a single integrity metric for a vehicle pose estimate. FIG. 2A additionally describes the process utilized to account for a probability distribution of a pose estimate. More particularly, the embodiment of FIG. 2A replaces a pose estimate with a pose hypothesis. Replacement of a pose estimate by a pose hypothesis may be repeated, for example, "N" times for each of "N" pose hypotheses. In an embodiment, "N" integrity metrics for each of the "N" pose hypotheses may then be fused via a weighted average. A localization integrity metric resulting from the weighted average can be utilized downstream by an autonomous vehicle driving application. It should be noted that confusion matrix statistics refer to true positive counts, false positive counts, true negative counts, and false negative counts, which form a basis for calculating the correlation metric. A correlation metric can be utilized as a basis for computing an integrity metric.

As depicted in FIG. 2A, vehicle 102 may include a number of signal sources represented by sensors 210. Accordingly, sensors 210, which may include a suite of sensors and/or measurement devices, may correspond to any number of sensors and/or devices, such as one or more of image capture device 212, one or more of radar sensor 214, one or more of lidar sensor 216, one or more of ultrasonic sensor 218, and so forth. Output signals, for example, from sensors 210 may include semantically-labeled observations and/or measurements 215, which operate to provide computing device 220 with input signals that estimate the localized environment of vehicle 102.

Computing device 220 may include or access vehicle pose estimate module 222 to compute an estimation of the pose of vehicle 102 for correlation with the vehicle's expected position on, or derived from, semantically-labeled electronic map 225. Based, at least in part, on a relatively strong or high correlation between the vehicle's estimated pose and expected features from, or derived from, a semantically-labeled map, the vehicle's localization integrity may be considered to be relatively high. Conversely, based, at least in part, on a relatively weak or low correlation between the vehicle's estimated pose and features expected to be present on the semantically-labeled map, the vehicle's location integrity may be considered to be relatively low. In the embodiment of FIG. 2A, integrity metric measurement model 224 of computing device 220 may be utilized to determine which features are likely to be present on, or derived from, semantically-labeled electronic map 225. Based on a relatively high correlation (or at least in accordance with a predetermined threshold correlation) between expected semantic labels 226 and semantically-labeled observations and measurements, autonomous vehicle driving application 230 may plan and/or perform control functions of vehicle 102. Signals and/or signal states representing expected semantic labels 226 may then be conveyed to confusion matrix statistics computing module 228, which may, in particular embodiments, compute the Matthews correlation coefficient. The Matthews correlation coefficient may utilize instances of false positives, false negatives, true positives, and true negatives, which may be utilized by integrity metric computing module 229. A computed integrity metric of vehicle pose may then be utilized by autonomous vehicle driving application 230.

Figure 2B:
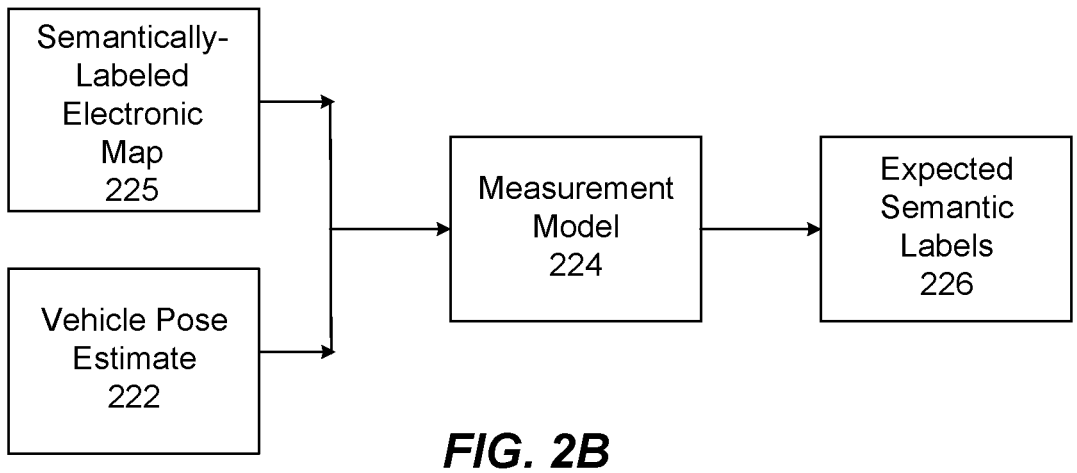
FIG. 2B depicts a subprocess for computing expected semantic labels in a system for evaluating integrity of vehicle pose estimates, according to an embodiment.

FIG. 2B depicts a subprocess for computing expected semantic labels in a system for evaluating integrity of vehicle pose estimates, according to an embodiment 250. In the embodiment of FIG. 2B, measurement model 256 may receive, obtain, or otherwise access signals representing parameters from semantically-labeled map electronic 225 and signals representing vehicle pose estimate 254. Additionally, measurement model 256 may operate to cross correlate among sensor observations and/or measurement input signals, account for sensor latencies, retrodict and/or predict an estimated location of stationary obstacles and features as well as dynamic obstacles, and eliminate or at least discount spurious sensor output signals. Further, measurement model 256 may retrodict and/or predict estimated positions of stationary obstacles in relation to a static reference frame as well as to retrodict and/or predict an estimate locations of dynamic obstacles in relation to a moving reference frame. In particular embodiments, measurement model 256 may operate to assign weights to sensor observations and/or measurements, in which, for example, input signals representing comprehensive images from an image capture sensor 212 may be weighted more heavily than individual measurements from lidar sensor 216. Measurement model 256 may include additional functionality, and claimed subject matter is not limited in this respect. Output signals from measurement model 256 may correspond to expected semantic labels 258.

In particular embodiments, based In particular embodiments, estimates of the pose of vehicle 102 may be provided in the form of a probability density function, which may be utilized to derive a hypothesized (e.g., most likely) pose estimate of vehicle 102. Computing device 220 may additionally observe, based on sensor measurements and/or observations semantic classes to static and dynamic obstacles present in an environment of vehicle 102. Based on estimates of the pose of vehicle 102, or a probability density function thereof, as well as an estimated sensor-derived presence of static obstacles, dynamic obstacles, and/or static features, computing device 220 may analyze parameters derived from semantically-labeled electronic map 225. In an embodiment, computing device 220 may observe, based on sensor observations and/or measurements, one or more semantic classes to sensor-estimated static obstacles, static features, and/or dynamic obstacles in the environment of vehicle 102. Semantic classes observed by computing device 220 may be compared with semantic classes that accord with (or correspond to) semantic labels derived from semantically-labeled electronic map 225. Such sensor-estimated obstacles and/or features and their corresponding locations derived from semantically-labeled electronic map 225 may be utilized to corroborate, or to contradict, the computed pose.

Computing device 220 may initiate a process to evaluate integrity of vehicle pose estimates by receiving, obtaining, or accessing observations and/or measurements 215. Based on such observations and/or measurements, computing device 220 may compute estimates the pose of vehicle 102. In particular embodiments, an estimated vehicle pose may be computed based on positioning measurements from, for example, signals from a satellite positioning system (e.g., GPS), an onboard compass, an onboard three-axis accelerometer, an onboard inertial navigation system, and so forth. Following computation of estimated vehicle pose, computing device 220 may generate and/or observe a first set of semantic classes to static obstacles and/or static features estimated to be present in the localized environment of vehicle 102 based on sensor measurements and/or observations. Computing device 220 may then access or otherwise obtain parameters of static obstacles and/or static features, which may be expected to be present in the environment of vehicle 102, from semantically-labeled electronic map 225. In an example, computing device 220 may estimate a current position of vehicle 102 as being adjacent to a particular freeway overpass based on semantically-labeled observations and measurements. Based on the estimated current position of vehicle 102, computing device 220 may access parameters of static obstacles and/or features, which may be expected to be adjacent to the estimated current position of vehicle 102. In this example, based on computing device 220 determining that a freeway overpass is present on semantically-labeled electronic map 225, computing device 220 may affirm, with at least a predetermined threshold of confidence, that the pose of vehicle 102 has been estimated within a threshold error tolerance.

In particular embodiments, vehicle 102 may utilize additional sensor measurements and/or observations, such as lidar sensors, radar sensors, and so forth, to enhance confidence in the estimated pose of vehicle 102. Accordingly, computing device 220 may utilize such additional measurements and/or observations to estimate that the vehicle is in the presence of certain additional obstacles and/or features. Such obstacles and/or features may include static obstacles such as stationary vehicles, stoplights, natural objects, etc. Additional measurements and/or observations may also enable detection of a presence of dynamic objects, such as other moving vehicles, as well as estimating a more precise location of vehicle 102, such as determining that the vehicle is presently in the rightmost lane of a particular street. Computing device 220 may compute a correlation between semantic classes observed to be correlated with obstacles and/or features based on onboard vehicle sensor measurements and/or observations and semantic labels extracted or derived from obstacles and/or features indicated on a semantically-labeled digital map. A correlation module may operate to estimate the correlation between observed semantic classes and expected classes extracted from the semantically-labeled digital map.

Computing device 220 may operate to compute any suitable correlation between observed semantic classes and semantic labels from, or derived from a semantically-labeled digital map. In particular embodiments, a correlation module may utilize a Matthews Correlation Coefficient (MCC) to determine a correlation between observed and expected semantic classes. Accordingly, computing device 220 may compute the MCC in accordance with expression (1) below:

$$MCC = \frac{TP \times TN - FP \times FN}{\sqrt{(TP+FP)(TP+FN)(TN+FP)(TN+FN)}} \quad (1)$$

wherein the MCC accounts for true positive (TP) counts, true negative (TN) counts, false positive (FP) counts, and false negative (FN) counts. Thus, in an embodiment, a true positive (TP) may correspond to an estimated positive match between a feature class and/or obstacle class observed in response to sensor observations and/or measurements by computing device 220 and a feature class and/or obstacle class from a semantically-labeled digital map. A true negative (TN) may correspond to an instance of detected free space, in which computing device 220 has estimated that no obstacle and/or feature is present at a portion of the vehicle environment and no obstacle and/or feature is present on a semantically-labeled digital map. A false positive (FP) may correspond to an instance in which computing device 220 has estimated a presence of an obstacle class and/or feature class at a portion of the vehicle environment while a semantically-labeled digital map indicates that no obstacle and/or feature is present. A false negative (FN) may correspond to an instance in which computing device 220 has detected free space while a semantically-labeled digital map indicates that an obstacle class and/or feature class is present.

Computing device 220 may compute one or more hypotheses of vehicle pose from a probability distribution of the pose of vehicle 102. In addition, computing device 220 may compute positive or negative deviations from the computed one or more vehicle pose hypotheses. Computing device 220 may additionally compute at least one sample point to represent a deviation from the computed one or more vehicle pose hypotheses. Computing device 220 may further compute the transformation of a distribution of computed vehicle pose hypotheses, in which the transformation operates to transform a nonlinear function that represents, or is derived from, the distribution of the one or more computed vehicle pose hypotheses. In particular embodiments, a nonlinear function that represents, or is derived from, the distribution of the one or more computed vehicle pose hypotheses corresponds to the MCC of expression (1). In particular embodiments, the transformation computed from a nonlinear function corresponds to the Unscented transform. A methodology involving the Unscented transform may operate to fuse or combine signals representing the MCCs of sample points corresponding to pose estimates of vehicle 102. Fused or combined output signals representing the MCCs (e.g., a weighted sum representing output signals in response to computing the MCCs) may be converted to a common parameterization, such as value of between −1.0 (to indicate perfect disagreement) to +1.0 (to indicate perfect agreement).

Based on output signals generated responsive to application of a transform, such as the Unscented transform, computing device 220 may provide a most likely estimate of vehicle pose. In addition, computing device 220 may provide an integrity metric of the estimated pose of vehicle 102, which conveys a measure of confidence in the estimate of the vehicle pose. Based on a measure of confidence and the estimate of vehicle pose, autonomous vehicle driving application 230 may control and/or influence the motion vector of vehicle 102. Such control and/or influence may include generating (or planning to generate) one or more braking commands, generating one or more acceleration commands, generating one or more commands to apply steering to the left or to the right, or combinations thereof.

Figure 3:
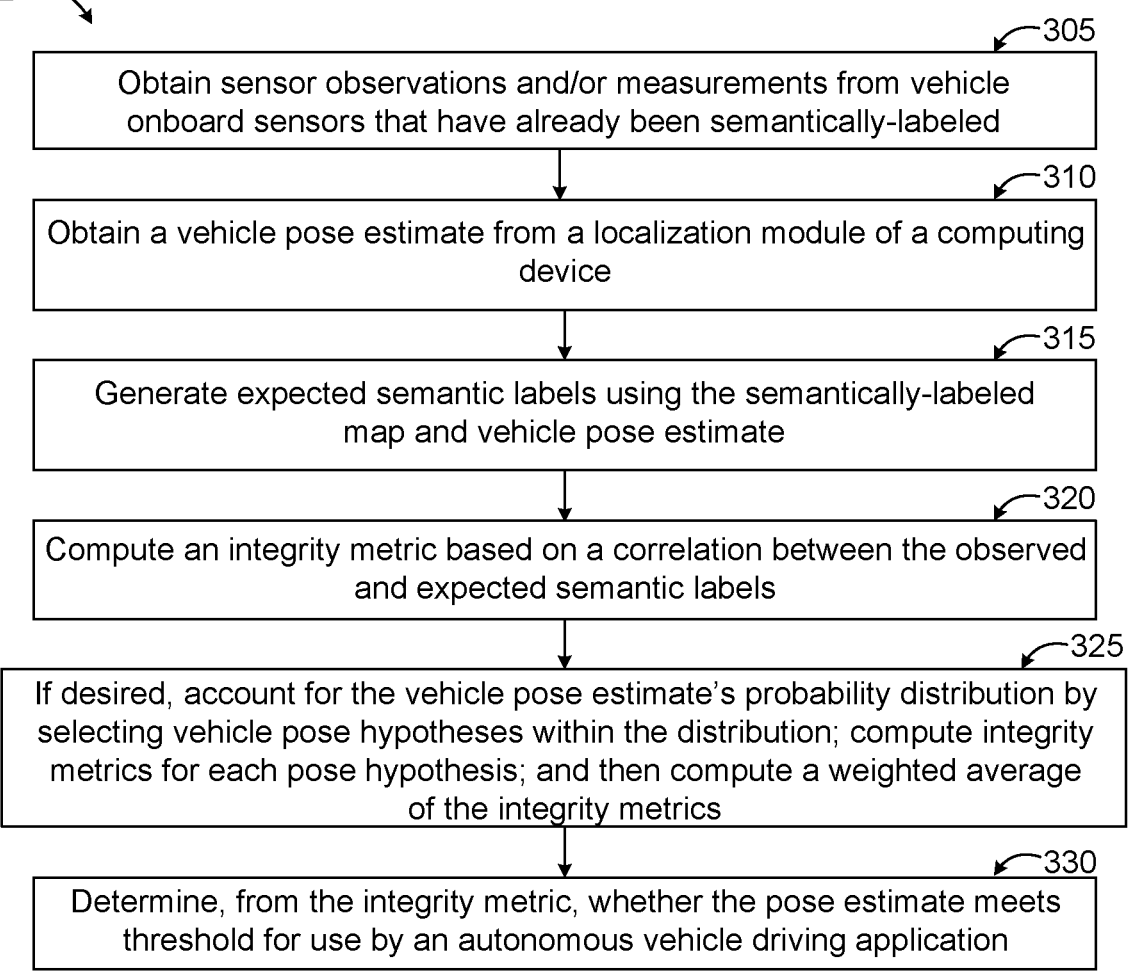
FIGS. 3-4 depict flow diagrams of an example processes for evaluating integrity of vehicle pose estimates via semantic labels, according to embodiments.

FIG. 3 depicts a flow diagram of an example process for evaluating integrity of vehicle pose estimates via semantic labels, according to an embodiment 300. In particular embodiments, the embodiments of FIGS. 3-4 may be performed via computing device 220 and autonomous vehicle driving application 230, described in reference to FIG. 2B. Embodiments in accordance with claimed subject matter may include all of the actions depicted in operations 305-330 and 405-420 (described hereinbelow), fewer actions than those depicted in operations 305-330 and 405-420 and/or more actions than those depicted in operations 305-330 and 405-420. Likewise, it should be noted that content acquired or produced, such as, for example, input signals, output signals, operations, results, etc., brought about by the example processes of embodiments 300 and 400 (described hereinbelow) may be represented via one or more digital signals. It should also be appreciated that even though one or more operations are illustrated or described concurrently or with respect to a certain sequence, other sequences or concurrent operations may be employed. In addition, although the description below references particular aspects and/or aspects illustrated in certain other figures, one or more operations may be performed with other aspects and/or aspects. In embodiments, operations 305-330 may be communicated as one or more signals and/or signal packets among various software, firmware and/or hardware services executed at a computing device, such as autonomously operatable vehicle 102, for example.

The method of embodiment 300 may begin at operation 305, which includes obtaining sensor observations and/or measurements, such as by way of one or more of sensors 210 described in reference to FIG. 2A, which have already been semantically-labeled. Accordingly, operation 305 may include one or more of sensors 210 obtaining multiple signal samples from positioning sensors, such as signals from a satellite positioning system (e.g., GPS), a compass, an accelerometer (e.g., three-axis accelerometer), an inertial navigation system, etc. The method may continue at operation 310, which may include computing device 220 of FIG. 2A obtaining a pose estimate of vehicle 102 from a localization module operating under the control of computing device 220. Computing device 220 may generate a pose estimate by computing a weighted sum of input signals representing sensor observations and/or measurements collected at operation 305. The method may continue at operation 315, in which, computing device 220 may extract a first set of semantic classes to features and/or obstacles, such as static features and/or obstacles, from parameters derived or extracted from one or more of semantically-labeled electronic map 225 of FIG. 2A. The method may continue at operation 320, which may include computing an integrity metric based on a correlation between observed and expected semantic labels extracted or derived from semantically-labeled electronic map 225. The method may continue at operation 325, in which, if desired, a distribution of the vehicle pose estimate's probability distribution may be accounted for by selecting a vehicle pose hypothesis within the distribution. The method may additionally include computing integrity metrics for each pose hypothesis, and then computing a weighted average of the computed integrity metrics. The method may continue at operation 330, which may include determining, from the integrity metric, whether the pose estimate meets a threshold for use by autonomous vehicle driving application 230.

Figure 4:
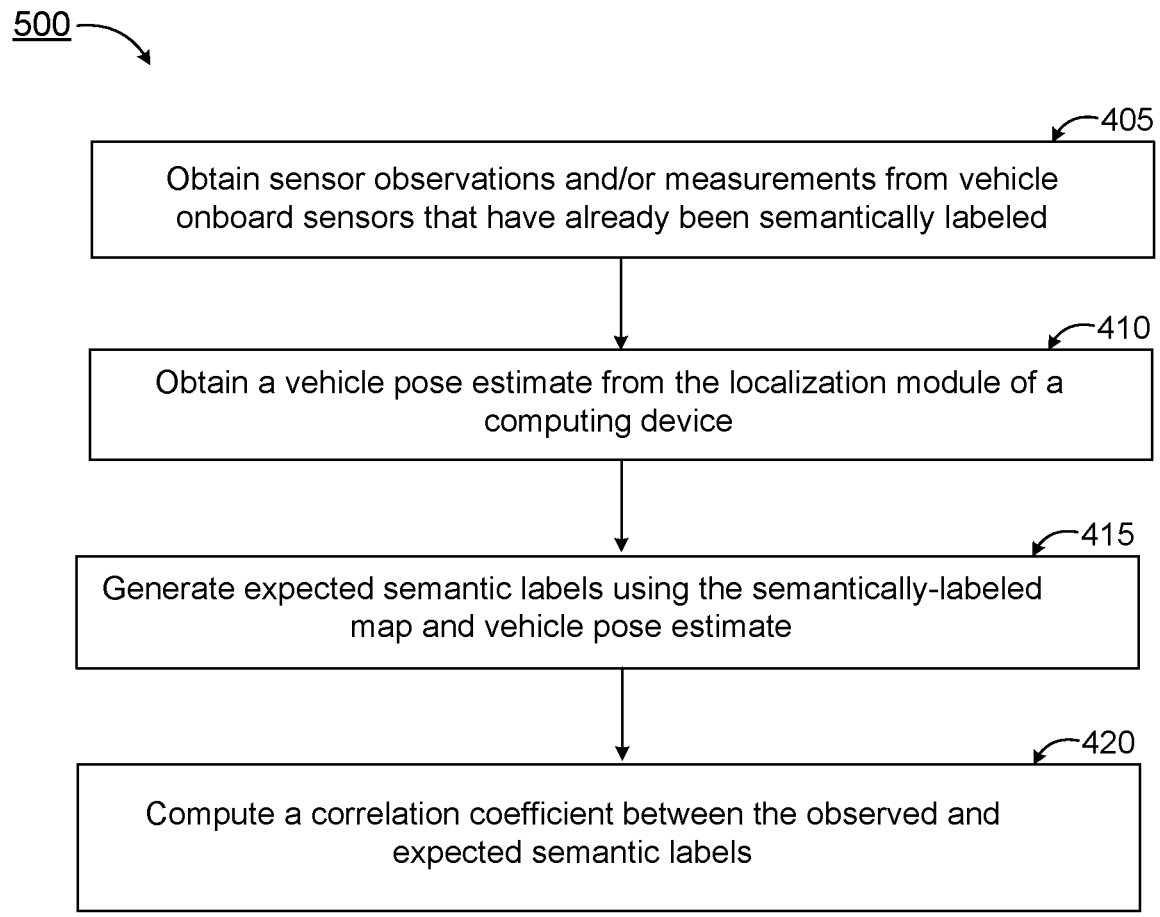

FIG. 4 depicts a second flow diagram of an example process for evaluating integrity of vehicle pose estimates via semantic labels, according to an embodiment 400. The method of FIG. 4 may begin at operation 405, which may include obtaining or accessing, such as from one or more memory devices, sensor measurements generated by one or more sensors onboard vehicle 102. Sensor observations and/or measurements may have already been semantically-labeled, such as by computing device 220 of FIG. 2A. The method may continue at operation 410, which may include obtaining a vehicle pose estimate from localization module of computing device 220. The method may continue at operation 415, which may include generating expected semantic labels using the semantically-labeled electronic map and one or more vehicle pose estimates from the localization module of computing device 220. The method may continue at operation 420, which may include computing a correlation coefficient between the observed and expected semantic classes extracted from a semantically-labeled electronic map.

Figure 5:
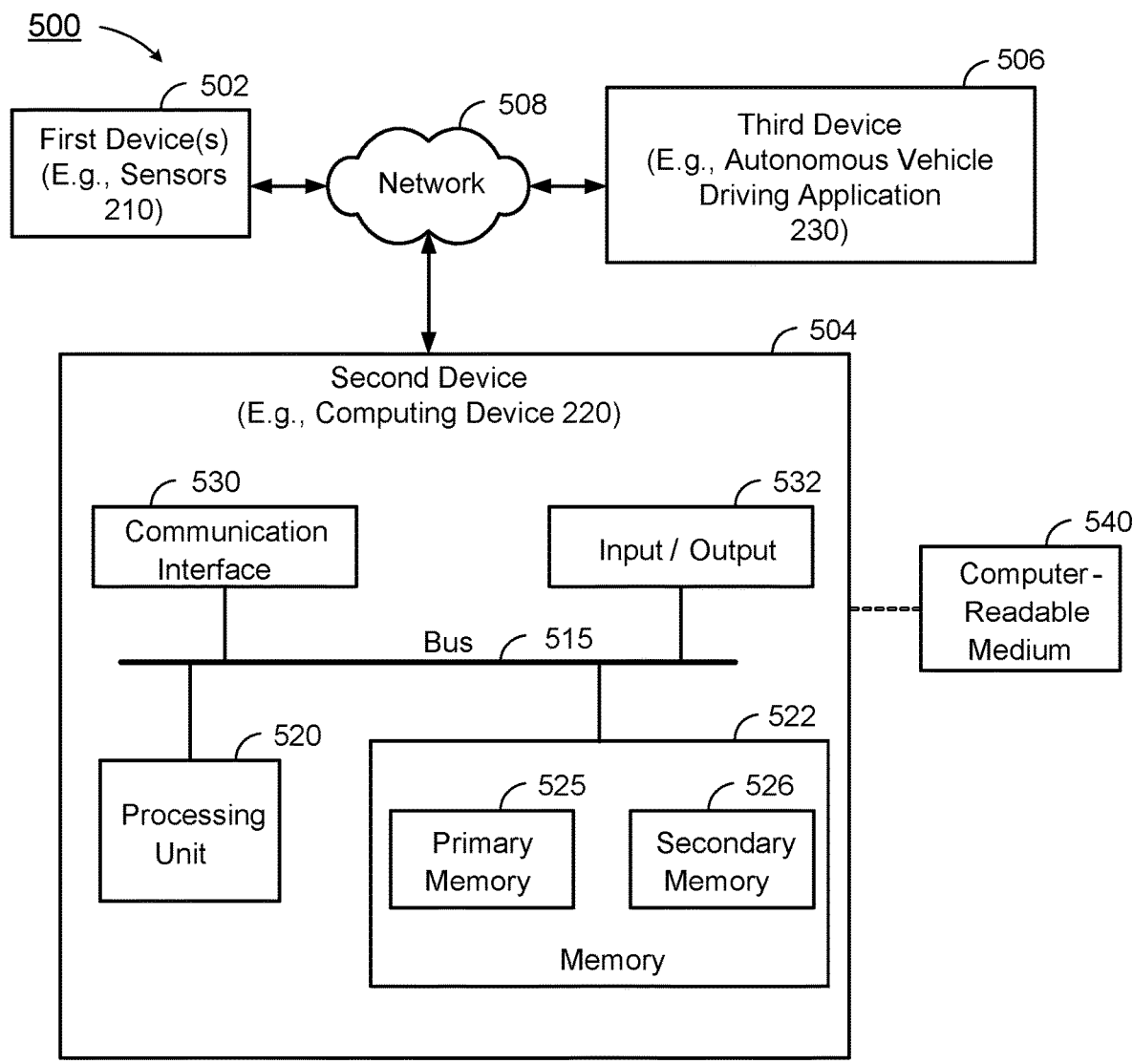
FIG. 5 is a schematic block diagram illustrating an example computing system environment, according to an embodiment.

FIG. 5 is a diagram showing a computing environment, according to an embodiment 500. The embodiment of FIG. 5 may correspond to a computing environment that includes computing device 220 (of FIG. 2A) communicating with an autonomous vehicle driving application, such as driving application 230 of FIG. 2A. In the embodiment of FIG. 5, first and third devices 502 and 506 may facilitate rendering of a graphical user interface (GUI) for use in a vehicle equipped with an automated vehicle driving application. Second device 504 may potentially serve a similar function in this illustration. Likewise, in FIG. 5, first device 502 may interface with second device 504, which may, for example, also include aspects of a vehicle on board server computing device, in an embodiment. Processor 520 and memory 522, which may include primary memory 525 and secondary memory 526, may communicate by way of a communication interface 530, for example, and/or input/output module 532. The term "computing device," or "computing resource" in the present patent application, refers to a system and/or a device, such as a computing apparatus that includes a capability to process (e.g., perform computations) and/or store digital content, such as electronic files, electronic documents, measurements, text, images, video, audio, etc., in the form of signals and/or states. Thus, a computing device, in the setting or environment of the present patent application, may include hardware, software, firmware, or any combination thereof (other than software per se). Computing device 504, as depicted in FIG. 5, is merely one example, and claimed subject matter is not limited in scope to this particular example.

In FIG. 5, first device 502 may provide one or more sources of executable computer instructions in the form of physical states and/or signals (e.g., stored in memory states), for example. First device 502 may communicate with second device 504 by way of a network connection, such as via network 508, for example. As previously mentioned, a connection, while physical, may be virtual while not necessarily being tangible. Although second device 504 of FIG. 5 shows various tangible, physical components, claimed subject matter is not limited to a computing devices having only these tangible components as other implementations and/or embodiments may include alternative arrangements that may include additional tangible components or fewer tangible components, for example, that function differently while achieving similar results. Rather, examples are provided merely as illustrations. It is not intended that claimed subject matter be limited in scope to illustrative examples.

Memory 522 may include any non-transitory storage mechanism. Memory 522 may include, for example, primary memory 525 and secondary memory 526, additional memory circuits, mechanisms, or combinations thereof may be used. Memory 522 may include, for example, random access memory, read only memory, etc., such as in the form of one or more storage devices and/or systems, such as, for example, a disk drive including an optical disc drive, a solid-state memory drive, etc., just to name a few examples.

Memory 522 may include one or more articles utilized to store a program of executable computer instructions. For example, processor 520 may fetch executable instructions from memory and proceed to execute the fetched instructions. Memory 522 may also include a memory controller for accessing device readable-medium 540 that may carry and/or make accessible digital content, which may include code, and/or instructions, for example, executable by processor 520 and/or some other device, such as a controller, as one example, capable of executing computer instructions, for example. Under direction of processor 520, a non-transitory memory, such as memory cells storing physical states (e.g., memory states), comprising, for example, a program of executable computer instructions, may be executed by processor 520 and able to generate signals to be communicated via a network, for example, as previously described. Generated signals may also be stored in memory, also as previously suggested.

Memory 522 may store electronic files and/or electronic documents, such as relating to one or more users, and may also include a machine-readable medium that may carry and/or make accessible content, including code and/or instructions, for example, executable by processor 520 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Example devices in FIG. 5 may include aspects, for example, of a client computing device and/or a remote/server computing device, in an embodiment. It is further noted that the term computing device, in general, whether employed as a client and/or as a server, or otherwise, refers at least to a processor and a memory connected by communications bus 515. A "processor," for example, is understood to refer to a specific structure such as a central processing unit (CPU) of a computing device which may include a control unit and an execution unit. In an aspect, a processor may include a device that interprets and executes instructions to process input signals to provide output signals. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device," "processor" and/or similar terms; however, if it is determined, for some reason not immediately apparent, that the foregoing understanding cannot stand and that 35 USC § 112 (f), therefore, necessarily is implicated by the use of the term "computing device," "processor" and/or similar terms, then, it is intended, pursuant to that statutory section, that corresponding structure, material and/or acts for performing one or more functions be understood and be interpreted to be described at least in FIGS. 1-5 and in the text associated with the foregoing figure(s) of the present patent application.

In implementations, obtaining measurements from sensors and/or measurement devices may include obtaining a particular set of parameters in accordance with one or more specified parameters may include ordering a particular set of data elements with respect to distance from a specified point of vehicle 102 along a specified axis and/or trajectory within the particular spatial coordinate system, for example. Also, in implementations, obtaining output signals from sensors and/or measurement devices may include selecting the particular set of data elements based at least in part on a specified range of distance from a specified point along a specified axis and/or trajectory within a particular spatial coordinate system, for example.

Further, for example, obtaining output signals from sensors and/or measurement devices in accordance with one or more specified parameters may include grouping individual parameters of the particular set of data elements into a plurality of subsets based at least in part on particular individual data elements being located within particular grid cells within the particular spatial coordinate system. Also, in implementations, processing of output signals from sensors and/or measurement devices may include ordering a plurality of subsets with respect to distance of the respective grid cells from a specified point along a specified axis and/or trajectory within the particular spatial coordinate system, for example. In implementations, obtaining output signals from sensors and/or measurement devices may include selecting the particular data elements based at least in part on a specified period of time and may also include ordering the particular set of data elements with respect to temporal proximity to a specified point in time, for example.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of aspects, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively include a sum of at least two components. Thus, for a given measurement, for example, one component may include a deterministic component, which in an ideal sense, may include a physical value (e.g., sought via one or more measurements), often in the form of one or more signals, signal samples and/or states, and one component may include a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

The terms "correspond," "reference", "associate", and/or similar terms relate to signals, signal samples and/or states, e.g., components of a signal measurement vector, which may be stored in memory and/or employed with operations to generate results, depending, at least in part, on the above-mentioned, signal samples and/or signal sample states. For example, a signal sample measurement vector may be stored in a memory location and further referenced wherein such a reference may be embodied and/or described as a stored relationship. A stored relationship may be employed by associating (e.g., relating) one or more memory addresses to one or more another memory addresses, for example, and may facilitate an operation, involving, at least in part, a combination of signal samples and/or states stored in memory, such as for processing by a processor and/or similar device, for example. Thus, in a particular context, "associating," "referencing," and/or "corresponding" may, for example, refer to an executable process of accessing memory contents of two or more memory locations, for example, to facilitate execution of one or more operations among signal samples and/or states, wherein one or more results of the one or more operations may likewise be employed for additional processing, such as in other operations, or may be stored in the same or other memory locations, as may, for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) a memory location.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may include two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters include physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may include one or more network devices and/or one or more computing devices, for example. As an illustrative example, but without limitation, a node may include one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

For one or more embodiments, computing device and/or networking device may also include an autonomously operatable vehicle, for example. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining," "establishing," "obtaining," "identifying," "selecting," "generating," and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In the preceding description, various aspects of claimed subject matter have been described. For purposes of explanation, specifics, such as amounts, systems and/or configurations, as examples, were set forth. In other instances, well-known aspects were omitted and/or simplified so as not to obscure claimed subject matter. While certain aspects have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A vehicle pose integrity monitor for use with an autonomous driving controller, comprising:
   a memory, the memory comprising one or more memory devices; and
   a processor coupled to the one or more memory devices, the processor configured to:
   access, from the one or more memory devices, sensor measurements generated by one or more sensors mounted in a vehicle;
   observe one or more semantic classes to one or more physical entities based on the generated sensor measurements;
   extract one or more semantically-labeled map parameters from an electronic map;
   determine a correlation between the one or more observed semantic classes and one or more expected classes extracted from the semantically-labeled map parameters based on a computation of true positive rate counts, false positive rate counts, true negative rate counts, and false negative rate counts;
   compute a localization integrity based on the correlation; and
   generate one or more operations to direct at least one autonomous driving application to perform one or more functions to influence a motion vector of the vehicle.

2. The vehicle pose integrity monitor of claim 1, wherein the one or more physical entities comprises:
   a non-drivable region, a drivable region, a structure, a lane marking, a natural object or a traffic sign, or a combination thereof.

3. The vehicle pose integrity monitor of claim 1, wherein the processor is further configured to:
   execute one or more operations to plan motion of the vehicle based on the computed localization integrity.

4. The vehicle pose integrity monitor of claim 1, wherein the processor is further configured to:
   compute one or more vehicle pose hypotheses; and
   compute positive or negative deviations from the computed one or more vehicle pose hypotheses.

5. The vehicle pose integrity monitor of claim 4, wherein the processor is further configured to:
   compute at least one sample point to represent a deviation from the computed one or more vehicle pose hypotheses.

6. The vehicle pose integrity monitor of claim 5, wherein the processor is further configured to:
   compute a correlation coefficient for each of the one or more computed vehicle pose hypotheses.

7. The vehicle pose integrity monitor of claim 6, wherein the one or more computed vehicle pose hypotheses comprises a plurality of computed vehicle pose hypotheses, and wherein the processor is further configured to:
   compute a transformation of a distribution of the plurality of computed vehicle pose hypotheses.

8. The vehicle pose integrity monitor of claim 7, wherein the transformation operates to transform a nonlinear function that represents, or is derived from, the distribution of the plurality of computed vehicle pose hypotheses.

9. The vehicle pose integrity monitor of claim 8, wherein the computed vehicle pose hypotheses comprises a critical input for generating the one or more expected semantic classes.

10. The vehicle pose integrity monitor of claim 9, wherein the transformation operates to create a weighted average of each of the one or more computed vehicle pose hypotheses.

11. A method to provide vehicle pose integrity for use with an autonomous driving controller, the method being performed by one or more processors and comprising:
    accessing, from one or more memory devices, sensor measurements generated by one or more sensors mounted in a vehicle;
    observing one or more semantic classes to one or more physical entities based on the generated sensor measurements;
    extracting one or more semantically-labeled map parameters from an electronic map;
    computing a correlation between the one or more observed semantic classes and one or more expected classes extracted from the semantically-labeled map parameters based on a computation of true positive rate counts, false positive rate counts, true negative rate counts, and false negative rate counts;
    computing a localization integrity based on the correlation; and
    generating one or more operations to direct at least one autonomous driving application to perform one or more functions to influence a motion vector of the vehicle.

12. The method of claim 11, wherein the one or more physical entities comprises: a non-drivable region, a drivable region, a structure, a lane marking, a natural object or a traffic sign, or a combination thereof.

13. The method of claim 11, further comprising:
    executing one or more operations to plan motion of the vehicle based on the computed localization integrity.

14. The method of claim 11, further comprising:
    computing one or more vehicle pose hypotheses; and
    computing positive or negative deviations from the computed one or more vehicle pose hypotheses.

15. The method of claim 14, further comprising:
    computing at least one sample point to represent a deviation from the computed one or more vehicle pose hypotheses.

16. The method of claim 15, further comprising:
    computing a correlation coefficient for each of the one or more computed vehicle pose hypotheses.

17. The method of claim 16, wherein the one or more computed vehicle pose hypotheses comprises a plurality of computed vehicle pose hypotheses, and further comprising:
  computing a transformation of a distribution of the plurality of computed vehicle pose hypotheses.

18. The method of claim 17, wherein the transformation operates to transform a nonlinear function that represents, or is derived from, the distribution of the plurality of computed vehicle pose hypotheses.

19. The method of claim 18, wherein the computed vehicle pose hypotheses comprises a critical input for generating the one or more expected semantic classes.

20. A non-transitory computer-readable medium comprising encoded program instructions for causing one or more processors of a vehicle pose integrity monitor to perform at least the following:
  access sensor measurements generated by one or more sensors mounted in a vehicle;
  observe one or more semantic classes to one or more physical entities based on the generated sensor measurements;
  extract one or more semantically-labeled map parameters from an electronic map;
  compute a correlation between the one or more observed semantic classes and one or more expected classes extracted from the semantically-labeled map parameters based on a computation of true positive rate counts, false positive rate counts, true negative rate counts, and false negative rate counts;
  compute a localization integrity based on the correlation; and
  generate one or more operations to direct at least one autonomous driving application to perform one or more functions to influence a motion vector of the vehicle.

\* \* \* \* \*